(No Model.) 3 Sheets—Sheet 1.
C. A. FLEMING.
HAY RAKE AND LOADER.
No. 504,975. Patented Sept. 12, 1893.
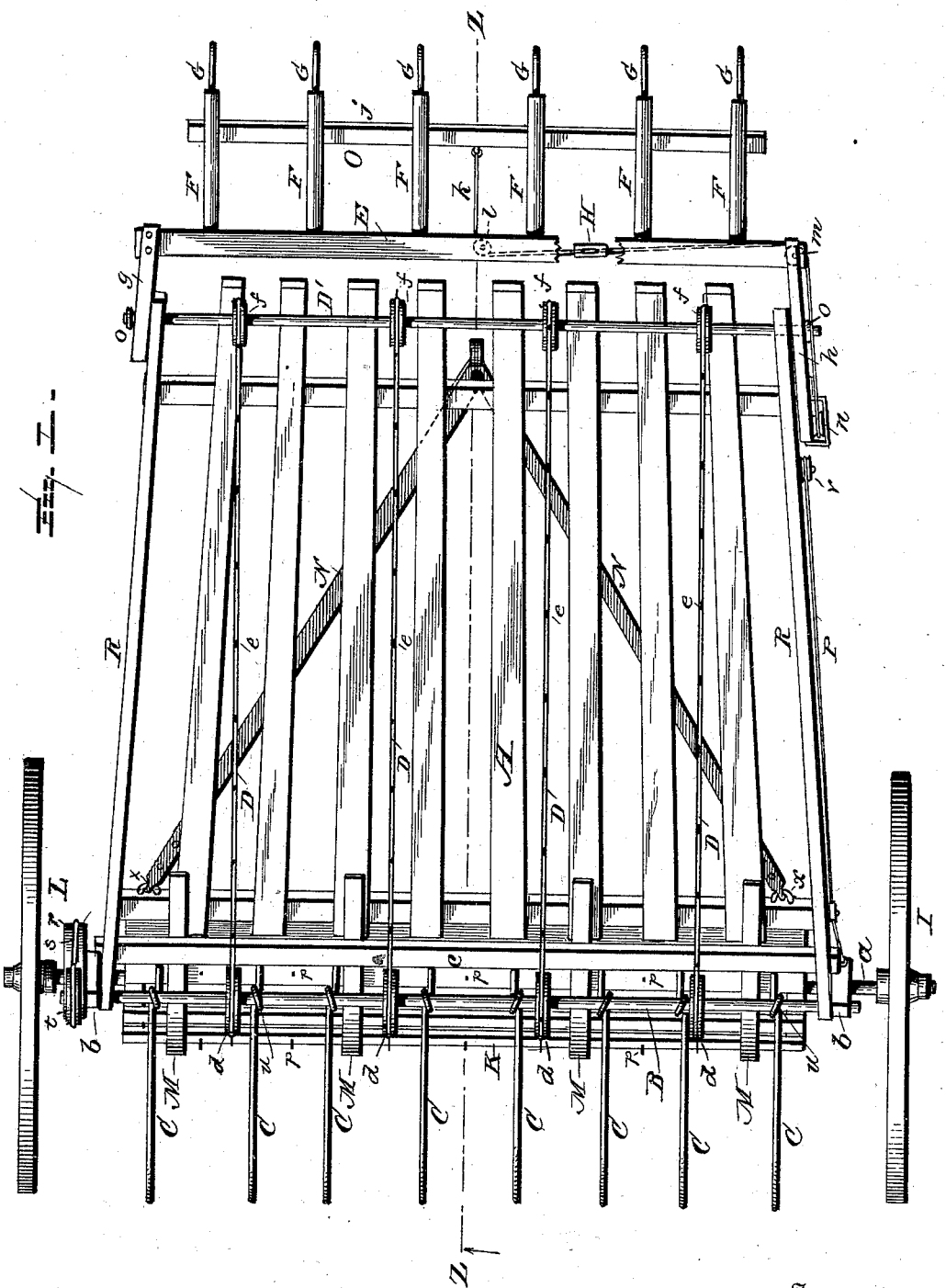
Witnesses
L. C. Hills
Y. M. Cofenhaver
Inventor
Clifford A. Fleming
per Chas. N. Fowler
Attorney

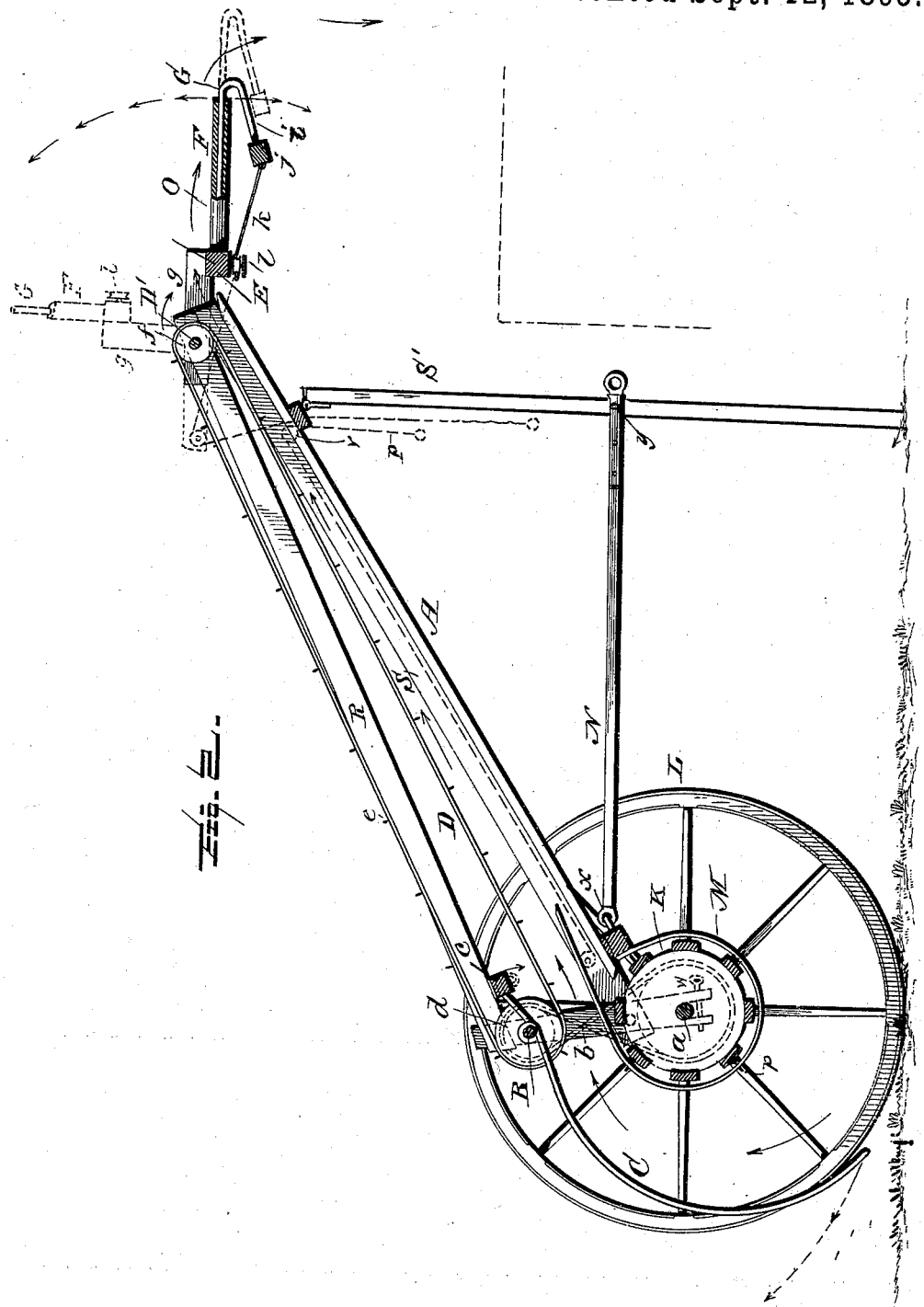

(No Model.) 3 Sheets—Sheet 3.
C. A. FLEMING.
HAY RAKE AND LOADER.
No. 504,975. Patented Sept. 12, 1893.
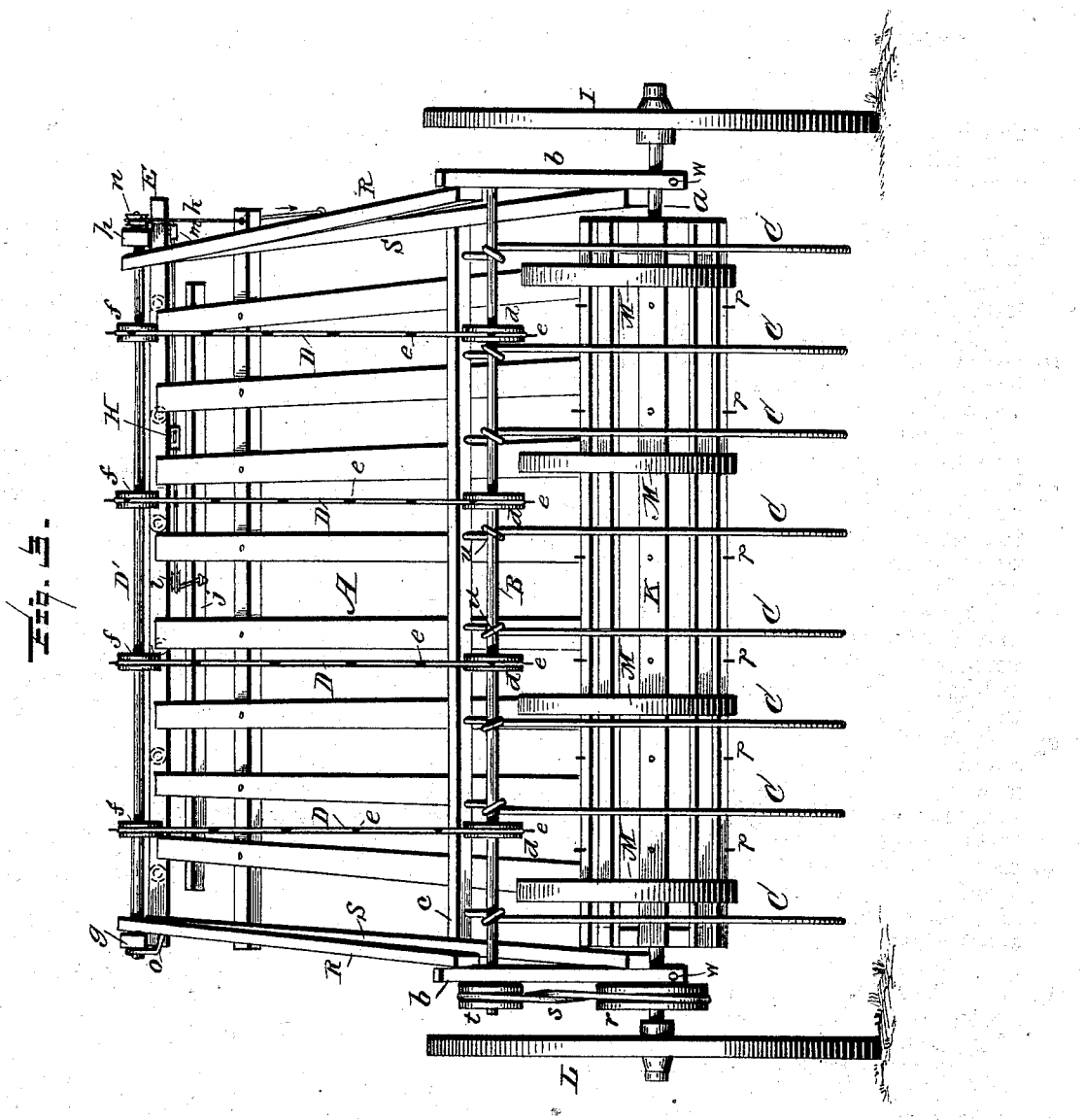
Witnesses
L. C. Hills.
G. M. Copenhaver.
Inventor
Clifford A. Fleming.
per Chas. H. Fowler
Attorney

UNITED STATES PATENT OFFICE.

CLIFFORD A. FLEMING, OF HUNTSVILLE, MISSOURI.

HAY RAKE AND LOADER.

SPECIFICATION forming part of Letters Patent No. 504,975, dated September 12, 1893.

Application filed December 16, 1892. Serial No. 455,338. (No model.)

*To all whom it may concern:*

Be it known that I, CLIFFORD A. FLEMING, a citizen of the United States, residing at Huntsville, in the county of Randolph and State of Missouri, have invented certain new and useful Improvements in Hay Rakes and Loaders; and I do hereby declare that the following is a full, clear, and exact description of the same, reference being had to the annexed drawings, making a part of this specification, and to the letters of reference marked thereon.

The present invention has for its object to provide a simple and practical machine that will effectually rake the hay out of the swath and deposit it upon a wagon, and consists in the several details of construction substantially as shown in the drawings and hereinafter described and claimed.

Figure 1 of the drawings represents a top plan view of my improved machine; Fig. 2 a vertical longitudinal section taken on line $zz$ of Fig. 1. Fig. 3 represents an elevation looking toward the rear of the machine.

In the accompanying drawings A represents a slatted frame of the usual construction and is supported on the axle $a$ in any convenient manner that will allow the axle to freely turn. In the present instance I have shown standards $b$ through which the ends of the axle loosely passes and to which the frame is rigidly connected. The ends of a transverse shaft B pass loosely through the standards $b$, said shaft forming a guide and support for the rake-teeth C, and a rake-head $c$ is connected to the teeth at their ends in the rear of the shaft.

Upon the shaft B are suitably keyed a plurality of grooved pulleys $d$ around which pass cords or belts D having affixed thereto suitable teeth $e$, said belts extending forward and around smaller grooved pulleys $f$ upon a transverse shaft D', the pulleys being loosely supported thereon so that they will freely turn while the shaft remains stationary.

Upon the projecting ends of the shaft D' are pivotally supported suitable arms $g$ $h$ and these arms in turn are rigidly affixed to a transverse bar E from which project tubular guides F for the extensible rods G. These rods enter the tubular-guides and have curved or hooked outer ends $i$ to which is connected a suitable head $j$ and to this head is attached one end of a cord $k$ which extends back over a pulley $l$ upon the under side of the bar E and thence in a lateral direction to the end of the bar where the cord passes over a pulley $m$ upon the end thereof. The cord also extends over a pulley $n$ upon the end of the bar $h$ and the cord extends down within reach of a person upon the ground, whereby the bar E with its attachments may be elevated and at the same time the extensible rods G brought back into the tubular guides F.

The bar E, tubular guides F, and the extensible rods G form together a frame upon which the hay is received from the main frame of the machine, and by means of the extensible rods, the frame may be contracted in size when in the act of depositing the load upon the wagon, through the medium of the cord as above described.

To the cord $k$ is adjustably connected a suitable stop H, which stop will strike the pulley $l$ and limit the degree to which the rods G will be extended when the supplemental frame is in its normal position. The position upon the cord $k$ of the stop H will regulate the distance the rods G will extend, and any suitable device that will serve as a stop may be used and connected to the cord in any suitable manner that will admit of its adjustability thereon, so that the distance between the point of attachment of the cord to the head $j$ and the stop H, may be increased or diminished. The small pulleys $f$ if so preferred, may be keyed to the shaft D' and said shaft revolve with the pulleys, such changes being left with the manufacturer of the machines.

To prevent the supplemental frame from descending too far I provide stops $o$ which may be of any suitable and well known form and against which the arms $g$ $h$ strike when the frame assumes its normal position, thus supporting it at the desired angle. The wheel I is rigidly connected to the axle $a$ so that when the wheel turns the axle will turn with it and carry around the slatted drum K which is provided with teeth $p$ and is rigidly secured to the axle. The wheel L is loosely mounted upon the axle $a$ and has rigidly connected to its hub a grooved pulley $r$ around which passes a cord or belt $s$, said cord or belt extending around a smaller pulley t keyed or otherwise rigidly connected to the end of the shaft B. Any suitable and well known means may be employed for turning the shaft, such as an arrangement of gear-wheels, sprocket wheels and chain, or any similar and well known device that will serve the purpose and effect the object sought.

To the rear of the frame A are connected spring arms M to prevent the hay from catching in the slatted drum K, said spring-arms being curved in such manner as to encircle the drum as shown more clearly in Fig. 2.

I reserve the right to make any changes in the details of construction or modifications in the several operating parts of the machine as would come within ordinary mechanical skill and this without departing from the principle of my invention.

Any suitable means may be employed for connecting the team to the machine, such for instance as the angular draft-bars N suitably connected to the frame of the machine.

The hay taken up by the rake-teeth C is carried over the drum K as the latter revolves, and by means of the revolving or movable belts D, which are in a direction toward the front of the machine, as indicated by the arrows in Fig. 2, the hay will be caught thereby and carried upward to the end of the frame and crowded onto the platform or supplemental frame as indicated at O, and from said frame onto the wagon.

The peculiar construction or devices constituting the supplemental frame O enables the hay therefrom to be deposited upon different parts of the wagon.

The tubular guides F serve as fingers as do also the extensible rods G, and when the rods are needed to deposit the hay on front end of wagon, the rods are pulled out their full length, and when needed to deposit the hay in the middle of the wagon, the rods may be pulled into the tubular-guides by means of the cord k so that only the curved ends will project from the tubular-guides.

The supplemental frame O is elevated by means of the cord k when it is desired to deposit the hay on the rear end of the wagon, the frame when elevated allowing the hay to pass under it.

The rake-teeth C are pivotally supported upon the shaft B by forming eyes u in two or more of the teeth through which passes the shaft, thus enabling the teeth to be elevated off the ground by means of the cord P connected to the rake-head c and extending along the side of the frame and passing over a pulley v so that the driver may elevate the teeth to pass over any obstruction. It is also found convenient to elevate the rake or rake-teeth in going from one field to another or to go on the road after finishing the work of loading the wagons.

In constructing the frame A, I prefer to connect it to two braces R S which are arranged at an angle to each other as shown more clearly in Fig. 2, these braces being connected at their lower ends to the standards b which are slotted at their lower ends to straddle the axle a. With the employment of the braces above described, the weight and strain are thrown upon the strongest part of the machine, and if desired the braces may be removed by taking out the pins w from the slotted ends of the standards b and disconnecting the other parts of the machine from the braces.

The machine may be attached to any wagon or may be drawn by a team connected direct to the machine as found desirable. If preferred the extensible rods may be removed from the hollow guides F by detaching the cord therefrom, as the rods are made detachable as well as extensible. The draft-bars N are hinged to the rear of the frame of the machine as shown at x and are suitably connected together at their front ends, thus serving the double purpose of draft-bars when a team is hitched thereto, and a brace-frame to hold the supporting-bar S' in an upright position, which bar supports the frame of the machine in the position shown in Fig. 2. The upper end of the bar S' is hinged to the under side of the frame of the machine and extends down between the bars N and held in engagement therewith by a pin y or by any other suitable means found best adapted to the purpose.

Having now fully described my invention, what I claim as new, and desire to secure by Letters Patent, is—

1. In a combined hay-rake and loader, the combination with a suitable frame and rake-teeth, of a supplemental frame pivoted to the front end of the main frame and consisting of tubular guides and extensible rods, and means for operating them substantially as and for the purpose specified.

2. In a hay-rake and loader, the combination with a suitable frame and rake-teeth, of a supplemental frame consisting of tubular guides and extensible rods extending into the guides and having their front ends hooked, and a cord connected thereto and an adjustable stop on the cord, substantially as and for the purpose set forth.

In testimony that I claim the above I have hereunto subscribed my name in the presence of two witnesses.

CLIFFORD A. FLEMING.

Witnesses:
C. B. SHAEFER,
JIM L. HAMMETT.